United States Patent [19]

Yasue et al.

[11] Patent Number: 5,414,042
[45] Date of Patent: May 9, 1995

[54] REINFORCED POLYAMIDE RESIN COMPOSITION AND PROCESS FOR PRODUCING THE SAME

[75] Inventors: Kenji Yasue; Tsuneo Tamura; Shinichiro Katahira; Mioko Watanabe, all of Kyoto, Japan

[73] Assignee: Unitika Ltd., Hyogo, Japan

[21] Appl. No.: 174,040

[22] Filed: Dec. 28, 1993

[30] Foreign Application Priority Data

Dec. 29, 1992 [JP] Japan ................... 4-360955

[51] Int. Cl.⁶ .................................. C08K 3/34
[52] U.S. Cl. ........................ 524/789; 524/449; 524/606; 524/791; 524/879; 523/216
[58] Field of Search .......... 524/789, 791, 879, 606, 524/449; 523/216

[56] References Cited

U.S. PATENT DOCUMENTS

| | | | |
|---|---|---|---|
| 3,883,469 | 5/1975 | Brassat | 524/789 |
| 4,555,439 | 11/1985 | Ueada et al. | 524/606 |
| 4,623,586 | 11/1986 | Umeya et al. | 524/494 |
| 4,739,007 | 4/1988 | Okada et al. | 524/789 |
| 5,204,078 | 4/1993 | Tateyama et al. | 423/332 |

FOREIGN PATENT DOCUMENTS 141230 6/1989 Japan.

OTHER PUBLICATIONS

"Synthesis of Expandable Fluorine Mica from Talc", Tateyama et al. Clays and Clay Minerals, vol. 40, No. 2, pp. 180–185, 1992.

"Summary of Recommendations of AIPEA Nomenclature Committee", S. W. Bailey, Clay Science 5, pp. 209–220, 1979.

*Primary Examiner*—Tae H. Yoon
*Attorney, Agent, or Firm*—Sughrue, Mion, Zinn, MacPeak & Seas

[57] ABSTRACT

A reinforced polyamide resin composition which involves 100 parts by weight of a polyamide and from 0.01 to 100 parts by weight of fluoromica-based mineral with swelling characteristics.

A process for producing the reinforced polyamide resin composition involving polymerizing a monomer in a state where from 0.01 to 100 parts by weight of fluoromica-based mineral with swelling characteristics is present per the monomer in an amount of forming 100 parts by weight of a polyamide.

The reinforced polyamide resin composition is excellent in mechanical strength, toughness, heat resistance and dimensional stability.

16 Claims, No Drawings

REINFORCED POLYAMIDE RESIN COMPOSITION AND PROCESS FOR PRODUCING THE SAME

FIELD OF THE INVENTION

This invention relates to a reinforced polyamide resin composition, which comprises a polyamide and a specific fluoromica-based mineral which exhibits excellent mechanical strength, toughness, heat resistance and dimensional stability, and to a process for producing the same.

BACKGROUND OF THE INVENTION

Resin compositions are widely known which have been obtained by reinforcing polyamides with fibrous materials such as glass fiber or carbon fiber or inorganic fillers such as calcium carbonate. However, these reinforcing materials show poor compatibility with polyamides. As a result, there problems occur in that the toughness of the reinforced polyamide is deteriorated, although the mechanical strength and heat resistance thereof are improved, and a molded article formed of such a resin composition reinforced with such fibrous materials undergoes serious warpage. In addition, there is another problem in that the mechanical strength and heat resistance of a resin composition reinforced with such inorganic fillers cannot be improved unless the fillers are blended in a large amount.

In an attempt to overcome these disadvantages of reinforced polyamides, there have been proposed resin compositions comprising polyamides with clay minerals, a typical example of which is montmorillonite. This concept is directed to producing a composite material where polyamide chains are incorporated between layers of a clay mineral and thus finely and uniformly dispersed therein. For example, JP-A-62-74957, JP-A-1-301750, JP-A-2-866628 and JP-A-3-7729 each disclose a resin composition comprising a polyamide with montmorillonite and a process for producing the same (the term "JP-A" as used herein means an "unexamined published Japanese patent application").

When montmorillonite is to be used for such a resin composition, however, it is essentially required to enlarge the interlayer distance of the montmorillonite by contacting it with a swelling agent (such as an amino acid) prior to blending the montmorillonite with a polyamide or a monomer capable of forming a polyamide, as is described in the unexamined published patent applications cited above. Therefore, there has been a great need in the art to develop an inorganic filler whereby the disadvantages of conventional reinforced polyamide resins can be overcome without performing the above-mentioned treatment.

SUMMARY OF THE INVENTION

The present invention is directed to solving the above-mentioned problems and provides a reinforced polyamide resin composition which is excellent in mechanical strength, toughness, heat resistance and dimensional stability and which undergoes no warpage when formed into a molded article; the present invention also provides an advantageous production process requiring no step of previously contacting an inorganic filler to be blended with a polyamide with a swelling agent.

To overcome the above-mentioned problems, the present inventors conducted extensive studies. As a result, they found that a reinforced polyamide resin composition comprising a polyamide in combination with a specific fluoromica-based mineral exhibits excellent performance and that the objects of the present invention can be efficiently solved by using a specific production process, thus achieving the present invention.

The gist of the present invention resides in the following points.

1. A reinforced polyamide resin composition comprising 100 parts by weight of a polyamide and from 0.01 to 100 parts by weight of a fluoromica-based mineral with swelling characteristics.
2. A process for producing a reinforced polyamide resin composition which comprises polymerizing monomer to form a polyamide therefrom where from 0.01 to 100 parts by weight of fluoromica-based mineral with swelling characteristics is present per the monomer in an amount of forming 100 parts by weight of a polyamide.

DETAILED DESCRIPTION OF THE INVENTION

The polyamide used in the present invention means a polymer having amide bonds in the main chain formed by the reaction of amino acid; lactam; or diamine with dicarboxylic acid. The amino acid is an intermediate compound which can be obtained by hydrolysis of lactam. The polyamide is also prepared by using the amino acid as a starting material.

Examples of monomers capable of forming such polyamides are as follows.

As amino acids, 6-amino caproic acid, 11-amino undecanoic acid, 12-amino dodecanoic acid and p-aminomethylbenzoic acid are exemplary.

As lactams, $\epsilon$-caprolactam and $\omega$-laurolactam are exemplary.

As diamines, tetramethylenediamine, hexamethylenediamine, undecamethylenediamine, dodecamethylenediamine, 2,2,4-/2,4,4-trimethylhexamethylenediamine, 5-methylnonamethylenediamine, 2,4-dimethyloctamethylenediamine, m-xylylenediamine, p-xylylenediamine, 1,3-bis(aminomethyl)cyclohexane, 1-amino-3-aminomethyl-3,5,5-trimethylcyclohexane, 3,8-bis(aminomethyl)tricyclodecane, bis(4-aminocyclohexyl)methane, bis(3-methyl-4-aminocyclohexyl)methane, 2,2-bis(4-aminocyclohexyl)propane, bis(aminopropyl)piperazine and aminoethylpiperazine are exemplary.

As dicarboxylic acids, adipic acid, suberic acid, azelaic acid, sebacic acid, dodecanoic diacid, terephthalic acid, isophthalic acid, naphthalenedicarboxylic acid, 2-chloroterephthalic acid, 2-methylterephthalic acid, 5-methylisophthalic acid, 5-sodium sulfoisophthalic acid, hexahydroterephthalic acid, hexahydroisophthalic acid and diglycolic acid are exemplary.

Preferred examples of the polyamide used in the present invention include polycaproamide (nylon 6), polytetramethylene adipamide (nylon 46), polyhexamethylene adipamide (nylon 66), polyhexamethylene sebacamide (nylon 610), polyhexamethylene dodecamide (nylon 612), polyundecamethylene adipamide (nylon 116), polyundecanamide (nylon 11), polydodecanamide (nylon 12), polytrimethylhexamethylene terephtalamide (nylon TMHT), polyhexamethylene isophthalamide (nylon 6I), polyhexamethylene terephthal/isophthalamide (nylon 6T/6I), polybis(4-aminocyclohexyl)methane dodecamide (nylon PACM 12), polybis(3- methyl-4-aminocyclohexyl)methane dodecamide (nylon dimethyl PACM 12), polymethaxylylene adipamide (nylon MXD 6), polyundecamethylene terephthalamide (nylon 11T), polyundecamethylene hexahydroterephthalamide [nylon 11T(H)], and other copolymerized polyamides obtained from two or more types of the aforementioned monomers, and mixed polyamides (a mixture of two or more of these polyamides). Among these materials, nylon 6, nylon 46, nylon 66, nylon 11, nylon 12 and corresponding copolymerized polyamides and mixed polyamides comprising these nylons are particularly preferable ones.

The polyamide used herein can be produced by the well known melt-polymerization method (cf. JP-A-55-151032) which can be optionally followed by the well known solid-phase polymerization method (cf. British Patent No. 798659 (1958)). Although the relative viscosity of the polyamide used in the present invention is not particularly restricted, it is preferable that the polyamide have a relative viscosity falling within a range of from 1.5 to 5.0, determined at a temperature of 25° C. and at a concentration of 1 g/dl with the use of phenol/tetrachloroethane (60/40, by weight) as a solvent. A relative viscosity lower than 1.5 is not preferable since the mechanical performance of the resin composition is deteriorated in this case. On the other hand, a relative viscosity exceeding 5.0 is also not preferable, since the molding properties of the resin composition rapidly deteriorate in this case.

The fluoromica-based mineral with swelling characteristics used in the present invention can be obtained by heating a mixture comprising talc with silicofluoride(s) or fluoride(s) of sodium and/or lithium. As a particular example of the method for producing the same, the one disclosed in JP-A-2-149415, hereby incorporated by reference, can be used. Namely, talc is employed as a starting material and sodium and/or lithium ions are intercalated into the silicate layers of talc to thereby give the desired fluoromica-based mineral with swelling characteristics. In the case of this method, talc is mixed with silicofluoride(s) and/or fluoride(s) of sodium and/or lithium and then heated in a porcelain crucible in air or preferably in a nitrogen atmosphere at a temperature of about 700° to 1,200° C. for a short period of time (generally, 5–6 hours) to thereby give the desired fluoromica-based mineral. In the present invention, it is particularly preferable to use the fluoromica-based mineral prepared by this method as the fluoromica-based mineral with swelling characteristics.

In order to obtain the fluoromica-based mineral with swelling characteristics, it is necessary to use sodium or lithium, among the alkali metals, as the metals constituting the silicofluoride(s) or fluoride(s). These alkali metals may be used either singly or in combination. Potassium, among the alkali metals, is not preferably used herein, since a fluoromica-based mineral with swelling characteristics cannot be obtained using potassium. However, potassium may be used in a limited amount (less than ⅓ of sodium and/or lithium by weight) together with sodium or lithium in order to control swelling characteristics. The content of the sodium and/or lithium silicofluoride(s) and/or fluoride(s) to be mixed with the talc preferably falls within a range of from 10 to 35% by weight based on the total mixture weight; an amount outside this range causes a decrease in the yield of the fluoromica-based mineral with swelling characteristics.

The fluoromica-based mineral with swelling characteristics prepared by the above-mentioned method has a structure represented by the following general formula (1).

$$a(MF) \cdot \beta(aMgF_2 \cdot bMgO) \cdot \gamma SiO_2 \qquad (1)$$

(wherein M represents sodium or lithium; and $\alpha$, $\beta$, $\gamma$, a and b each represent a coefficient provided that $0.1 \leq \alpha \leq 2$, $2 \leq \beta \leq 3.5$, $3 \leq \gamma \leq 4$, $0 \leq a \leq 1$, $0 \leq b \leq 1$ and $a + b = 1$.)

The term "swelling characteristics" as used herein means such properties that the fluoromica-based mineral absorbs polar molecules such as amino acids, nylon salts or water molecules or cations among its layers and thus the interlayer distance is enlarged or the fluoromica-based mineral undergoes further swelling or cleavage to thereby give ultrafine particles. The fluoromica-based mineral represented by the above formula (1) exhibits such swelling characteristics. The fluoromica-based mineral with swelling characteristics used in the present invention is preferably from 0.1 to 10 μm in size and from 0.001 to 0.1 μm in thickness. When analyzed by the X-ray powder method, the fluoromica-based mineral with swelling characteristics used in the present invention has a basal spacing along the C-axis of 9 to 20 Å.

The swelling characteristics can be evaluated by measuring the basal spacing of silicate layers in the fluoromica-based mineral by the use of X-ray. For example, 100 g of a fluoromica-based mineral is mixed with 10 l of 0.025N hydrochloric acid aqueous solution at room temperature, and 35 g of aminocapronic acid is added to the mixture, followed by stirring for 10 minutes. By this procedure, proton-added aminocapronic acid molecules are intercalated into silicate layers, and a swollen fluoromica-based mineral is obtained. An increase in basal spacing of silicate layers after this treatment can be taken as an index for the swelling characteristics.

The term "nylon salt" is a generic term representing a salt which is produced by a reaction of equimolar amounts of dicarboxylic acid and diaminde. By polycondensation, the nylon salt becomes polyamide. Examples of nylon salts include 6-6 salts, 4-6 salts, and 6-10 salts.

In one process for preparing the fluoromica-based mineral with swelling characteristics used in the present invention, a small amount (less than 20% by weight based on talc) of alumina ($Al_2O_3$; size: 0.01–10 μm) may be added so as to control the swelling characteristics of the resulting fluoromica-based mineral with swelling characteristics.

The fluoromica-based mineral with swelling characteristics is employed in an amount of from 0.01 to 100 parts by weight, preferably from 0.1 to 20 parts by weight, per 100 parts by weight of the polyamide or monomer capable of forming 100 parts by weight of the polyamide. It is undesirable that the content of the fluoromica-based mineral with swelling characteristics be smaller than 0.01 part by weight, since the object of the present invention, namely, improvement in mechanical strength, heat resistance and dimensional stability, cannot be achieved thereby. On the other hand, it is also undesirable that the content thereof exceeds 100 parts by weight, since toughness is seriously deteriorated in this case. The amount of monomer required to form 100 parts by weight of the polyamide is determined based on the kind of monomer. When lactam is used as monomer, 100 parts by weight of the monomer forms 100 parts by weight of polyamide. When amino acid or diamine and dicarboxylic acid is used as monomer, the amount of monomer is determined by taking into consideration the weight loss due to the polycondensation reaction to form the polyamide accompanies by dehydration.

As a process for producing the reinforced polyamide resin composition of the present invention, conventional mixing methods can be used, though the components of the present invention have not been known in combination, for example, a method comprising kneading the polyamide with the fluoromica-based mineral with swelling characteristics in a molten state using an extruder can be used. It is preferable to use a biaxial extruder so as to facilitate the dispersion of the fluoromica-based mineral with swelling characteristics. The range of extrusion temperature is usually from the melting point of the polyamide to the melting point of the polyamide plus 100° C. In this case, the fluoromica-based mineral with swelling characteristics used in the present invention can be blended as such and melt-kneaded without requiring any previous swelling treatment, as is needed in the case of montmorillonite.

The most desirable process for producing the reinforced polyamide resin composition according to the present invention comprises polymerizing a monomer capable of forming the desired polyamide in the presence of the fluoromica-based mineral with swelling characteristics to thereby give the desired reinforced polyamide resin composition. In this case, the fluoromica-based mineral with swelling characteristics is sufficiently finely dispersed in the polyamide and thus the effects of the present invention can be most remarkably achieved. In this case, the fluoromica-based mineral with swelling characteristics used in the present invention can be blended with the monomer and polymerized without effecting any previous swelling treatment, similar to the above-mentioned case.

The reinforced polyamide resin composition of the present invention may further contain conventional pigments, heat stabilizers, antioxidants, weathering agents, flame-retardants, plasticizers, mold release agents and other reinforcements, so long as the characteristics thereof are not seriously degraded thereby. As the heat stabilizers and the antioxidants, for example, hindered phenols, phosphorus compounds, hindered amines, sulfur compounds, copper compounds, alkali metal halides and mixtures thereof are usable. In particular, copper compounds and alkali metal halides exert the best effects. In general, these additives (for example, heat stabilizers, antioxidants, weathering agents) are added in the melt-kneading or polymerization step. As examples of the reinforcements, clay, talc, calcium carbonate, zinc carbonate, wallastonite, silica, alumina, magnesium oxide, calcium silicate, asbestos, sodium aluminate, calcium aluminate, sodium aluminosilicate, magnesium silicate, glass balloons, carbon black, zinc oxide, antimony trioxide, zeolites, hydrotalcide, metallic fibers, metallic whiskers, ceramic whiskers, potassium titanate, boron nitride, graphite, glass fibers and carbon fibers are exemplary.

If required for some special application, the resin composition of the present invention may further contain other polymers generally in an amount of from 1 to 50% by weight based on the total weight of the composition. Examples of these polymers include elastomers such as polybutadiene, butadiene-styrene copolymers, acrylic rubbers, ethylene-propylene copolymers, ethylene-propylene-diene copolymers, natural rubber, chlorinated butyl rubber and chlorinated polyethylene and materials obtained by denaturing these elastomers with acids such as maleic anhydride; styrene-maleic anhydride copolymers, styrene-phenylmaleimide copolymers, polyethylene, polypropylene, butadieneacrylonitrile copolymers, polyvinyl chloride, polyethylene terephthalate, polybutylene terephthalate, polyacetal, polyvinylidene fluoride, polysulfone, polyphenylene sulfide, polyether sulfone, phenoxy resin, polyphenylene ether, polymethyl methacrylate, polyether ketone, polyarylates, polycarbonate and polytetrafluoroethylene, alone or in admixture.

The resin composition of the present invention can be molded by conventional methods to thereby give molded articles. For example, it may be processed by heat-melt molding methods such as injection molding, extrusion molding, blow molding and sinter molding at the temperature falling within the range of from the melting point of the composition to the melting point of the composition plus 100° C. Alternatively, it may be dissolved in an organic solvent (e.g., metacresol, dimethylformamide, and formic acid) in a concentration of from 1 to 30% by weight based on the total weight of the solution, and then formulated into a film by casting. Compared a polyamide alone, the resin composition according to the present invention is significantly improved in mechanical strength, heat resistance and dimensional stability. In addition, it suffers from little change in mechanical properties or dimension due to water-absorption. The excellent performance of the resin composition of the present invention makes it usable, for example, in mechanical parts (for example, switchs, connectors) and housings in the field of electric and electronic instruments; under-bonnet parts and exterior materials, outside plates and optical instruments such as reflectors in the field of automobiles; and gears and bearing retainers in the field of machines.

To further illustrate the present invention in greater detail, the following Examples are given. The materials and determination methods for the evaluations employed in these Examples and Comparative Examples are as follows.

(1) Materials

1. Fluoromica-based mineral

Talc was powdered in a ball mill in such a manner as to give an average particle size of 2 μm and then mixed with the silicofluorides, fluoride or alumina as listed in Table 1 having the same average particle size of 2 μm in an amount of 20% by weight based on the total mixture for these latter materials. The thus obtained-mixture was then fed into a porcelain crucible and kept in an electric oven at 800° C. for 1 hour, preferably in a nitrogen atmosphere. Thus, fluoromica-based minerals M-1 to M-7 were obtained. When the fluoromica-based minerals thus formed were analyzed by the X-ray powder method, M-1 to M-6 showed no peak assignable to the basal spacing of 9.2 Å along the C-axis of talc but peaks at 12 to 16 Å, reflecting that fluoromica-based minerals with swelling characteristics had been formed. The size and thickness of the fluoromica-based minerals with swelling characteristics obtained are shown in Table 1.

TABLE 1

| Fluoromica-based mineral | M-1 | M-2 | M-3 | M-4 | M-5 | M-6 | M-7 |
|---|---|---|---|---|---|---|---|
| Content (%): | | | | | | | |
| Talc | 80 | 80 | 80 | 80 | 80 | 80 | 80 |
| Sodium Silicofluoride | 20 | | 6 | 10 | 16 | 6 | |
| Lithium Silicofluoride | | 20 | | 10 | 2 | 6 | |
| Potassium Silicofluoride | | | | | 2 | | 20 |
| Sodium Fluoride | | | 6 | | | | |
| Alumina | | | 8 | | | 8 | |
| Size (μm): | 2 | 2 | 2 | 2 | 2 | 2 | 2 |
| Thickness ((μm): | 0.07 | 0.06 | 0.08 | 0.07 | 0.07 | 0.08 | 0.07 |

Note:
The components are substantially represented by the formulae:
Talc: $Mg_3SiO_{10}(OH)_2$
Sodium Silicofluoride: $Na_2SiF_6$
Lithium Silicofluoride: $Li_2SiF_6$
Potassium Silicofluoride: $K_2SiF_6$
Sodium Fluoride: NaF
Alumina: $Al_2O_3$ 2. Clay minerals and inorganic fillers employed in the Comparative Examples Montmorillonite (a product of Nippon Talc).
Kaolin (a product of Shiraishi Kogyo).

(2) Determination methods

1. Tensile strength and breaking extension
Determined in accordance with ASTM D638.

2. Izod impact test
Performed in accordance with ASTM D256 using test pieces 3.2 mm in thickness.

3. Heat deformation temperature (HDT)
Determined in accordance with ASTM D648 under loads of 18.6 kg/cm² and 4.5 kg/cm².

4. Moisture absorption treatment
Test pieces were kept at 60° C. under an RH of 95% for 24 hours.

5. Dimensional changes
Using square test pieces of 2 mm in thickness and 50 mm per side, dimensional changes in thickness, length and width were measured after moisture absorption treatment. The dimensional changes in Tables 2–8 show the average value of these three values.

6. Water absorption
Using the same test pieces as those described in 5. above, weight gains after the completion of the Moisture absorption treatment described in 4. above were measured.

Examples 1 to 5

10 kg of ε-caprolactam was blended with 2 kg of water and M-1, M-2 or M-3 each in the amount as specified in Table 2 based on the weight of the ε-caprolactam. The mixture thus obtained was fed into a 30 liter reaction tank and the ε-caprolactam was polymerized in the presence of the fluoromica-based mineral with swelling characteristics. A reinforced nylon 6 resin composition was thus obtained. The polymerization was carried out in the following manner. In a nitrogen atmosphere, the blend was heated to 250° C. while stirring for 1 hour with the pressure being elevated from 4 kg/cm² to 15 kg/cm² while slowly discharging steam. The pressure was then reduced to 2 kg/cm² and the blend was polymerized at 260° C. for 3 hours while stirring at 30 r.p.m. Upon the completion of the polymerization, the reinforced nylon 6 resin composition was taken out from the reaction tank and cut into pellets. The pellets of the reinforced nylon 6 resin composition thus obtained (size: 3 mm) were washed with hot water at 95° C. for 5 hours, and the pellets were dried at 100° C. in vacuum for 8 hours and molded into test pieces. The molding of the test pieces was performed using an injection molding machine at a cylinder temperature of 260° C. and a mold temperature of 80° C.

Using the test pieces thus obtained, various tests were performed to evaluate the performance thereof. Table 2 summarize the results obtained.

TABLE 2

| Item | Ex. 1 | Ex. 2 | Ex. 3 | Ex. 4 | Ex. 5 |
|---|---|---|---|---|---|
| Polyamide | Nylon 6 | Nylon 6 | Nylon 6 | Nylon 6 | Nylon 6 |
| Component | M-1 | M-1 | M-1 | M-2 | M-3 |
| Content (wt. %) | 0.5 | 5.0 | 10.0 | 5.0 | 5.0 |
| Relative Viscosity of Polyamide | 2.6 | 2.6 | 2.5 | 2.6 | 2.7 |
| Untested Polyamide Composition: | | | | | |
| Tensile Strength (kg/cm²) | 750 | 810 | 870 | 800 | 800 |
| Breaking Extension (%) | 74 | 31 | 19 | 30 | 28 |
| Izod Impact Strength (kg cm/cm) | 3.4 | 3.5 | 3.1 | 3.1 | 3.4 |
| Heat Deformation Temp. | | | | | |
| (°C., 18.6 kg/cm²) | 86 | 121 | 140 | 120 | 122 |
| (°C., 4.5 kg/cm²) | 188 | 192 | 195 | 190 | 193 |
| After Absorbing Moisture: | | | | | |
| Water Absorption (wt. %) | 4.1 | 3.1 | 2.7 | 3.0 | 3.1 |
| Dimensional Change (%) | 0.9 | 0.7 | 0.6 | 0.7 | 0.7 |
| Tensile Strength (kg/cm²) | 490 | 600 | 650 | 590 | 590 |

TABLE 2-continued

| Item | Ex. 1 | Ex. 2 | Ex. 3 | Ex. 4 | Ex. 5 |
| --- | --- | --- | --- | --- | --- |
| Breaking Extension (%) | 130 | 56 | 40 | 53 | 55 |
| Izod Impact Strength (kg cm/cm) | 4.6 | 4.5 | 4.4 | 4.7 | 4.5 |

Examples 6 to 10

10 kg of a nylon 66 salt was blended with 3 kg of water and M-1, M-2 or M-3 each in the amount as specified in Table 3 based on the weight of the nylon 66 salt. The mixture thus obtained was fed into a 30 liter reaction tank and the nylon 66 salt was polymerized in the presence of the fluoromica-based mineral with swelling characteristics. A reinforced nylon 66 resin composition was thus obtained. The polymerization was carried out in the following manner. In a nitrogen atmosphere, the blend was heated to 230° C. while stirring until the internal pressure reached 18 kg/cm$^2$. The pressure was held at 18 kg/cm$^2$ by heating while slowly discharging steam for 1 hour. When the temperature reached 280° C., the pressure was reduced to atmospheric and the polymerization was continued for an additional 2 hours. Upon completion of the polymerization, the reinforced nylon 66 resin composition was taken out from the reaction tank and cut into pellets. The pellets were dried and molded into test pieces. The molding of the test pieces was performed using an injection molding machine at a cylinder temperature of 290° C. and a mold temperature of 80° C.

Using the test pieces thus obtained, various tests were performed to evaluate the performance thereof. Table 3 summarize the results obtained.

TABLE 3

| Item | Ex. 6 | Ex. 7 | Ex. 8 | Ex. 9 | Ex. 10 |
| --- | --- | --- | --- | --- | --- |
| Polyamide | Nylon 66 | Nylon 66 | Nylon 66 | Nylon 66 | Nylon 66 |
| Component | M-1 | M-1 | M-1 | M-2 | M-3 |
| Content (wt. %) | 0.5 | 5.0 | 10.0 | 5.0 | 5.0 |
| Relative Viscosity of Polyamide | 2.4 | 2.3 | 2.3 | 2.4 | 2.3 |
| Untested Polyamide Composition: | | | | | |
| Tensile Strength (kg/cm$^2$) | 820 | 860 | 930 | 850 | 850 |
| Breaking Extension (%) | 55 | 27 | 17 | 31 | 29 |
| Izod Impact Strength (kg cm/cm) | 4.5 | 4.2 | 4.1 | 4.4 | 4.3 |
| Heat Deformation Temp. | | | | | |
| (°C., 18.6 kg/cm$^2$) | 121 | 153 | 157 | 150 | 150 |
| (°C., 4.5 kg/cm$^2$) | 208 | 220 | 221 | 219 | 221 |
| After Absorbing Moisture: | | | | | |
| Water Absorption (wt. %) | 2.8 | 2.1 | 1.8 | 2.0 | 2.0 |
| Dimensional Change (%) | 0.6 | 0.5 | 0.4 | 0.5 | 0.5 |
| Tensile Strength (kg/cm$^2$) | 630 | 690 | 720 | 700 | 710 |
| Breaking Extension (%) | 83 | 46 | 35 | 42 | 40 |
| Izod Impact Strength (kg cm/cm) | 5.2 | 5.1 | 5.0 | 5.2 | 5.1 |

Examples 11 to 13

The procedures of earlier presented Examples 1 to 5 were repeated except that M-1, M-2 and M-3 were replaced with M-4, M-5 and M-6 each in the amount specified in Table 4. Reinforced nylon 6 resin compositions were thus obtained.

Test pieces were molded in the same manner as in earlier presented Examples 1 to 5. Using the thus obtained test pieces, various tests were performed to evaluate the performance thereof. Table 4 summarizes the results obtained.

TABLE 4

| Item | Ex. 11 | Ex. 12 | Ex. 13 |
| --- | --- | --- | --- |
| Polyamide | Nylon 6 | Nylon 6 | Nylon 6 |
| Component | M-4 | M-5 | M-6 |
| Content (wt. %) | 5.0 | 5.0 | 5.0 |
| Relative Viscosity of Polyamide | 2.5 | 2.5 | 2.4 |
| Untested Polyamide Composition: | | | |
| Tensile Strength (kg/cm$^2$) | 800 | 810 | 780 |
| Breaking Extension (%) | 46 | 52 | 68 |
| Izod Impact Strength (kg cm/cm) | 2.9 | 3.8 | 2.7 |
| Heat Deformation Temp. | | | |
| (°C., 18.6 kg/cm$^2$) | 116 | 121 | 118 |
| (°C., 4.5 kg/cm$^2$) | 183 | 180 | 183 |
| After Absorbing Moisture: | | | |
| Water Absorption (wt. %) | 3.0 | 3.1 | 3.1 |
| Dimensional Change (%) | 0.6 | 0.7 | 0.6 |
| Tensile Strength (kg/cm$^2$) | 600 | 600 | 610 |
| Breaking Extension (%) | 95 | 150 | 140 |
| Izod Impact Strength (kg cm/cm) | 4.8 | 4.2 | 4.4 |

Examples 14 to 16

The procedures of earlier presented Examples 6 to 10 were repeated except that M-1, M-2 and M-3 were replaced with M-4, M-5 and M-6 each in the amount specified in Table 5. Reinforced nylon 66 resin compositions were thus obtained.

Test pieces were molded in the same manner as employed in the earlier presented Examples 6 to 11. Using the thus obtained test pieces, various tests were performed to evaluate the performance thereof. Table 5 summarizes the results obtained.

TABLE 5

| Item | Ex. 14 | Ex. 15 | Ex. 16 |
|---|---|---|---|
| Polyamide | Nylon 66 | Nylon 66 | Nylon 66 |
| Component | M-4 | M-5 | M-6 |
| Content (wt. %) | 5.0 | 5.0 | 5.0 |
| Relative Viscosity of Polyamide | 2.2 | 2.2 | 2.3 |
| Untested polyamide Composition: | | | |
| Tensile Strength (kg/cm$^2$) | 860 | 860 | 850 |
| Breaking Extension (%) | 31 | 27 | 21 |
| Izod Impact Strength (kg cm/cm) | 4.5 | 4.2 | 4.4 |
| Heat Deformation Temp. | | | |
| (°C., 18.6 kg/cm$^2$) | 155 | 153 | 154 |
| (°C., 4.5 kg/cm$^2$) | 222 | 220 | 221 |
| After Absorbing Moisture: | | | |
| Water Absorption (wt. %) | 2.0 | 2.1 | 2.0 |
| Dimensional Change (%) | 0.4 | 0.5 | 0.5 |
| Tensile Strength (kg/cm$^2$) | 690 | 690 | 680 |
| Breaking Extension (%) | 47 | 46 | 42 |
| Izod Impact Strength (kg cm/cm) | 5.1 | 5.1 | 5.0 |

Example 17

10 kg of 12-amino dodecanoic acid was blended with 2 kg of water and M-1 in the amount as specified in Table 6 based on the weight of the 12-amino dodecanoic acid. The mixture thus obtained was fed into a 30 liter reaction tank and the 12-amino dodecanoic acid was polymerized in the presence of the fluoromica-based mineral with swelling characteristics. Thus a reinforced nylon 12 resin composition was obtained. The polymerization was carried out in the following manner. In a nitrogen atmosphere, the blend was heated to 180° C. while stirring until the internal pressure was elevated from 3 kg/cm$^2$ to 20 kg/cm$^2$. After elevating the pressure to 20 kg/cm$^2$, the blend was slowly heated to 240° C. while slowly discharging steam. Finally, the pressure was reduced to 1 kg/cm$^2$ and the polymerization was continued at 260° C. for an additional 2 hours. Upon completion of the polymerization, the reinforced nylon 12 resin composition was taken out from the reaction tank and cut into pellets. The pellets were dried and molded into test pieces. The molding of the test pieces was performed using an injection molding machine at a cylinder temperature of 270° C. and a mold temperature of 80° C.

Using the test pieces thus obtained, various tests were performed to evaluate the performance thereof. Table 6 summarize the results obtained.

TABLE 6

| Item | Ex. 17 | Comp. 9* |
|---|---|---|
| Polyamide | Nylon 12 | Nylon 12 |
| Component | M-1 | — |
| Content (wt. %) | 0.5 | — |
| Relative Viscosity of Polyamide | 3.2 | 3.2 |
| Untested Polyamide Composition: | | |
| Tensile Strength (kg/cm$^2$) | 540 | 430 |
| Breaking Extension (%) | >200 | >200 |
| Izod Impact Strength (kg cm/cm) | 7.1 | 7.3 |
| Heat Deformation Temp. | | |
| (°C., 18.6 kg/cm$^2$) | 74 | 49 |
| (°C., 4.5 kg/cm$^2$) | 171 | 136 |
| After Absorbing Moisture: | | |
| Water Absorption (wt. %) | 0.6 | 0.9 |
| Dimensional Change (%) | 0.2 | 0.3 |
| Tensile Strength (kg/cm$^2$) | 470 | 380 |
| Breaking Extension (%) | >200 | >200 |
| Izod Impact Strength (kg cm/cm) | 8.3 | 8.4 |

*Comparative Example 9 is later given.

Comparative Examples 1 to 4

The procedures of earlier presented Examples 1 to 5 were repeated except that M-1, M-2 and M-3 were replaced with M-7, montmorillonite and kaolin each in the amount specified in Table 7. Reinforced nylon 6 resin compositions were thus obtained.

Test pieces were molded in the same manner as employed in earlier presented Examples 1 to 5. Using the thus obtained test pieces, various tests were performed to evaluate the performance thereof. Table 7 summarizes the results obtained.

TABLE 7

| Item | Comp. 1 | Comp. 2 | Comp. 3 | Comp. 4 |
|---|---|---|---|---|
| Polyamide | Nylon 6 | Nylon 6 | Nylon 6 | Nylon 6 |
| Component | — | M-7 | Montmorillonite | Kaolin |
| Content (wt. %) | — | 5.0 | 5.0 | 5.0 |
| Relative Viscosity of Polyamide | 2.6 | 2.6 | 2.7 | 2.6 |
| Untested Polyamide Composition: | | | | |
| Tensile Strength (kg/cm$^2$) | 740 | 630 | 630 | 670 |
| Breaking Extension (%) | 180 | 2.2 | 1.6 | 1.8 |
| Izod Impact Strength (kg cm/cm) | 3.3 | 1.6 | 1.2 | 1.5 |
| Heat Deformation Temp. | | | | |
| (°C., 18.6 kg/cm$^2$) | 55 | 83 | 81 | 87 |
| (°C., 4.5 kg/cm$^2$) | 94 | 183 | 175 | 184 |

TABLE 7-continued

| Item | Comp. 1 | Comp. 2 | Comp. 3 | Comp. 4 |
|---|---|---|---|---|
| After Absorbing Moisture: | | | | |
| Water Absorption (wt. %) | 5.8 | 4.6 | 4.6 | 4.8 |
| Dimensional Change (%) | 1.2 | 0.9 | 1.1 | 1.0 |
| Tensile Strength (kg/cm$^2$) | 340 | 370 | 360 | 390 |
| Breaking Extension (%) | >200 | 2.2 | 2.0 | 2.1 |
| Izod Impact Strength (kg cm/cm) | 4.5 | 2.0 | 1.7 | 1.7 |

Comparative Examples 5 to 8

The procedures of earlier presented Examples 6 to 10 were repeated except that M-1, M-2 and M-3 were replaced with M-7, montmorillonite and kaolin each in the amount specified in Table 8. Thus, reinforced nylon 66 resin compositions were obtained. By using the thus obtained test pieces, various tests were performed to evaluate the performance thereof. Table 8 summarizes the results obtained.

TABLE 8

| Item | Comp. 5 | Comp. 6 | Comp. 7 | Comp. 8 |
|---|---|---|---|---|
| Polyamide | Nylon 66 | Nylon 66 | Nylon 66 | Nylon 66 |
| Component | — | M-7 | Montmorillonite | Kaolin |
| Content (wt. %) | — | 5.0 | 5.0 | 5.0 |
| Relative Viscosity of Polyamide | 2.4 | 2.4 | 2.3 | 2.3 |
| Untested Polyamide Composition: | | | | |
| Tensile Strength (kg/cm$^2$) | 800 | 710 | 740 | 770 |
| Breaking Extension (%) | 110 | 1.7 | 1.4 | 1.6 |
| Izod Impact Strength (kg cm/cm) | 4.6 | 1.9 | 1.7 | 1.7 |
| Heat Deformation Temp. | | | | |
| (°C., 18.6 kg/cm$^2$) | 74 | 144 | 142 | 147 |
| (°C., 4.5 kg/cm$^2$) | 180 | 217 | 217 | 218 |
| After Absorbing Moisture: | | | | |
| Water Absorption (wt. %) | 3.8 | 2.4 | 2.2 | 2.2 |
| Dimensional Change (%) | 0.8 | 0.6 | 0.7 | 0.6 |
| Tensile Strength (kg/cm$^2$) | 540 | 580 | 560 | 590 |
| Breaking Extension (%) | 180 | 2.1 | 1.7 | 1.8 |
| Izod Impact Strength (kg cm/cm) | 5.6 | 2.2 | 2.2 | 1.9 |

Comparative Example 9

The procedure of earlier presented Example 17 was repeated except using no fluoromica-based mineral with swelling characteristics, i.e., 12-amino dodecanoic acid was polymerized and nylon 12 was obtained. The performance of the obtained nylon 12 was evaluated in the same manner as employed in Example 17. The results are given in earlier presented Table 6.

According to the present invention, a reinforced polyamide resin composition having remarkably improved mechanical strength, toughness and dimensional stability, compared with a polymer comprising a polyamide alone, and which undergoes little deterioration in toughness and which has excellent impact strength can be obtained. Further, the fluoromica-based mineral of the present invention can be blended with a polyamide and melt-kneaded without performing any swelling treatment, as required in the case of using conventional clay minerals such as montmorillonite or, alternately, the fluoromica-based mineral is added to a monomer component capable of forming the desired polyamide and then the mixture is polymerized. Thus, a reinforced polyamide resin composition having excellent performance can be obtained.

While the invention has been described in detail and with reference to specific examples thereof, it will be apparent to one skilled in the art that various changes and modifications can be made therein without departing from the spirit and scope thereof.

What is claimed is:

1. A process for producing a reinforced polyamide resin composition which comprises polymerizing monomer to form a polyamide therefrom where from 0.01 to 100 parts by weight of fluoromica-based mineral with swelling characteristics is present per the monomer in an amount of forming 100 parts by weight of a polyamide.

2. A process for producing a reinforced polyamide resin composition as claimed in claim 1, wherein said fluoromica-based mineral with swelling characteristics is obtained by heating a mixture of talc with silicofluoride(s) or fluoride(s) of at least one of sodium and lithium.

3. A process for producing a reinforced polyamide resin composition as claimed in claim 1, wherein said fluoromica-based mineral with swelling characteristics is obtained by heating a mixture of from 90 to 65% by weight of talc with from 10 to 35% by weight of silicofluoride(s) or fluoride(s) of at least one of sodium and lithium 4. A process for producing a reinforced polyamide resin composition as claimed in claim 1, wherein said polyamide is polycaproamide (nylon 6).

5. A process for producing a reinforced polyamide resin composition as claimed in claim 1, wherein said polyamide is polyhexamethylene adipamide (nylon 66).

6. A process for producing a reinforced polyamide resin composition as claimed in claim 1, wherein said polyamide is polytetramethylene adipamide (nylon 46).

7. A process for producing a reinforced polyamide resin composition as claimed in claim 1, wherein said polyamide is polydodecanamide (nylon 12).

8. A process for producing a reinforced polyamide resin composition as claimed in claim 1, wherein said fluoromica-based mineral with swelling characteristics is used in an amount of from 0.1 to 20 parts by weight per 100 parts by weight of the polyamide.

9. A reinforced polyamide resin composition comprising 100 parts by weight of a polyamide and from 0.01 to 100 parts by weight of a fluoromica-based mineral with swelling characteristics, wherein said composition is formed by polymerizing monomer to form a polyamide therefrom where from 0.01 to 100 parts by weight of fluoromica-based mineral with swelling characteristics is present per the monomer in an amount of forming 100 parts by weight of a polyamide.

10. The reinforced polyamide resin composition as claimed in claim 9, wherein said fluoromica-based mineral with swelling characteristics is present in an amount of from 0.1 to 20 parts by weight per 100 parts by weight of the polyamide.

11. A reinforced polyamide resin composition as claimed in claim 9, wherein said fluoromica-based mineral with swelling characteristics is obtained by heating a mixture of talc with silicofluoride(s) or fluoride(s) of at least one of sodium and lithium.

12. A reinforced polyamide resin composition as claimed in claim 9, wherein said fluoromica-based mineral with swelling characteristics is obtained by heating a mixture of from 90 to 65% by weight of talc with from 10 to 35% by weight of silicofluoride(s) or fluoride(s) of at least one of sodium and lithium.

13. A reinforced polyamide resin composition as claimed in claim 9, wherein said polyamide is polycaproamide (nylon 6).

14. A reinforced polyamide resin composition as claimed in claim 9, wherein said polyamide is polyhexamethylene adipamide (nylon 66).

15. A reinforced polyamide resin composition as claimed in claim 9, wherein said polyamide is polytetramethylene adipamide (nylon 46).

16. A reinforced polyamide resin composition as claimed in claim 9, wherein said polyamide is polydodecanamide (nylon 12).

* * * * *